B. R. HAMBY.
PIPE COUPLING.
APPLICATION FILED OCT. 13, 1919.

1,351,645.

Patented Aug. 31, 1920.

B. R. Hamby.
Inventor

By Geo. P. Kimmel
Attorney

UNITED STATES PATENT OFFICE.

BENJAMIN RILLEY HAMBY, OF CRUM CREEK, OKLAHOMA.

PIPE-COUPLING.

1,351,645.

Specification of Letters Patent. Patented Aug. 31, 1920.

Application filed October 13, 1919. Serial No. 330,269.

*To all whom it may concern:*

Be it known that I, BENJAMIN RILLEY HAMBY, a citizen of the United States, residing at Crum Creek, in the county of Pushmataha and State of Oklahoma, have invented certain new and useful Improvements in Pipe-Couplings, of which the following is a specification.

This invention relates to pipe couplings and more particularly to pipe couplings formed on one piece of metal.

Heretofore great difficulty has been experienced in maintaining tight joints in pipe couplings constructed of several elements or sections. In many instances it has been necessary to insert washers between abutting ends or to dip the whole coupling in some substance adapted to fill in and close loose connections, and it is the principal object of the present invention to eliminate these disadvantages by forming the coupling of one piece of metal with no separate sections.

Another object of the invention is to form a coupling from a metallic blank which may be readily stamped and bent by a machine in large quantities and at a very small cost.

A further object is to form a coupling adapted for use with stove or ventilator pipes which will support the various sections of pipes while forming a tight and lasting coupling therefor.

Other objects of this invention not at this time more particularly enumerated, will be clearly understood from the detail description and drawings forming a part of this specification.

Furthermore this invention consists in the novel arrangement and combination of parts more particularly described in the following specification and embodied in the claims appended hereunto and forming part of this application.

Referring to the drawings.

Figure 1:
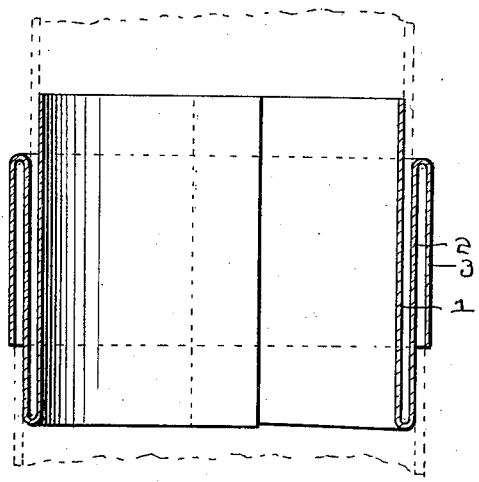
Figure 1 is a sectional side elevation of the coupling.

In the drawings wherein like characters of reference indicate like or similar parts throughout the several views the separate sections of the coupling are indicated by the numerals 1, 2 and 3 of which it will be noted that the section 1 is of the greatest width while the sections 2, and 3 decreased, 3 being the smallest.

Figure 3:
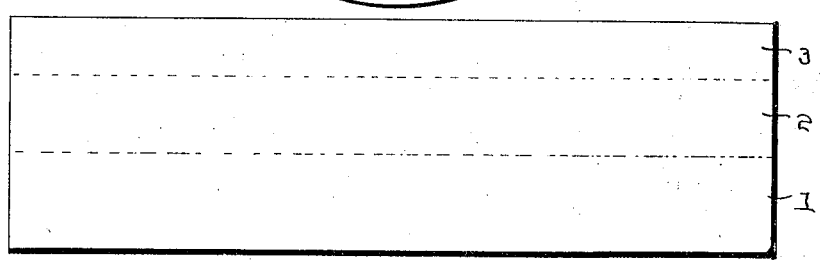
Fig. 3 is the blank from which the coupling forming the substance of the present invention is constructed.

Referring particularly to Fig. 3 wherein is illustrated the blank from which the present invention is formed the dotted lines are used to represent at which point the metal is bent to form the various coupling sections. Attention is called at this point to the fact it would require a very simple machine to form the rectilinear blank and bend the same into the proper construction to form a coupling.

Figure 2:
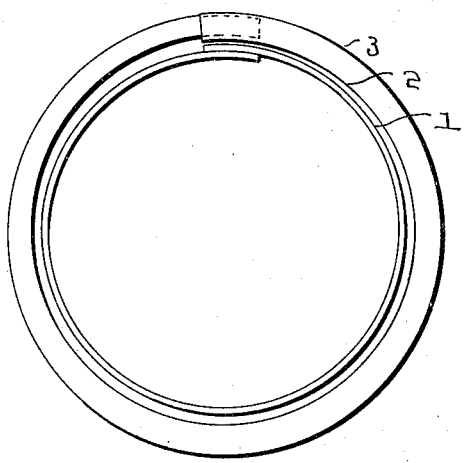
Fig. 2 is a top plan view thereof.

In the first instance the section 2 is bent over upon the section 1 and the section 3 bent back upon the section 2 all being slightly in spaced relationship and in parallelism. At this stage of construction the blank having the necessary sections 1, 2 and 3 formed therein is bent in the form of a circle the meeting edges of which intersect and slightly overlap so that the coupling can be expanded or contracted to fit various sizes of pipes or sections thereof as clearly shown in Fig. 2 of the drawings. It may be found necessary in some instances to weld or rivet these edges together but I do not desire in the present instance to limit myself to any one form of fastening means although the same might be found desirable. Attention is called to the fact that in bending the blank to form the coupling the broader section 1 is disposed intermost while the smallest section 3 is outermost.

In operation the meeting ends of two sections of pipe are forced into the annular deprevities formed by the sections 1 and 2 and 2 and 3 respectively and are securely held therein by the spring action of the metal forming the pipe coupling. Attention is called to the fact that the pipe coupling serves a dual capacity in that it acts as a supporting member for two sections of the pipe and as a coupling therefor; this would be particularly advantageous where stove pipe or ventilator pipe sections were arranged vertically.

It is also pointed out that any movement of the two sections of pipe relative to each other would tend to tighten the already efficient joints provided by the coupling. This is clearly illustrated in Fig. 1 of the drawings wherein the two sections of pipe are designated by the dotted lines.

From the foregoing description taken in connection with the accompanying drawings it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

What I claim is:

1. A pipe coupling comprising a tubular body longitudinally split with the adjacent edges overlapping for expansion and contraction of said body and inwardly and outwardly folded ends on the body to provide reversely extended flanges for forming pipe end receiving sockets.

2. A pipe coupling having an intermediate longitudinal split section and reversely extended exterior and interior portions formed thereupon to provide relatively deep channels for receiving the meeting ends of two sections of pipe.

3. A pipe coupling having an intermediate longitudinal split section and reversely extended exterior and interior portions formed thereupon to provide relatively deep channels for receiving the meeting ends of two sections of pipe, the intermediate section being of considerably less breadth than the interior portion and of greater breadth than the exterior portion.

In testimony whereof, I affix my signature hereto.

BENJAMIN RILLEY HAMBY.